UNITED STATES PATENT OFFICE.

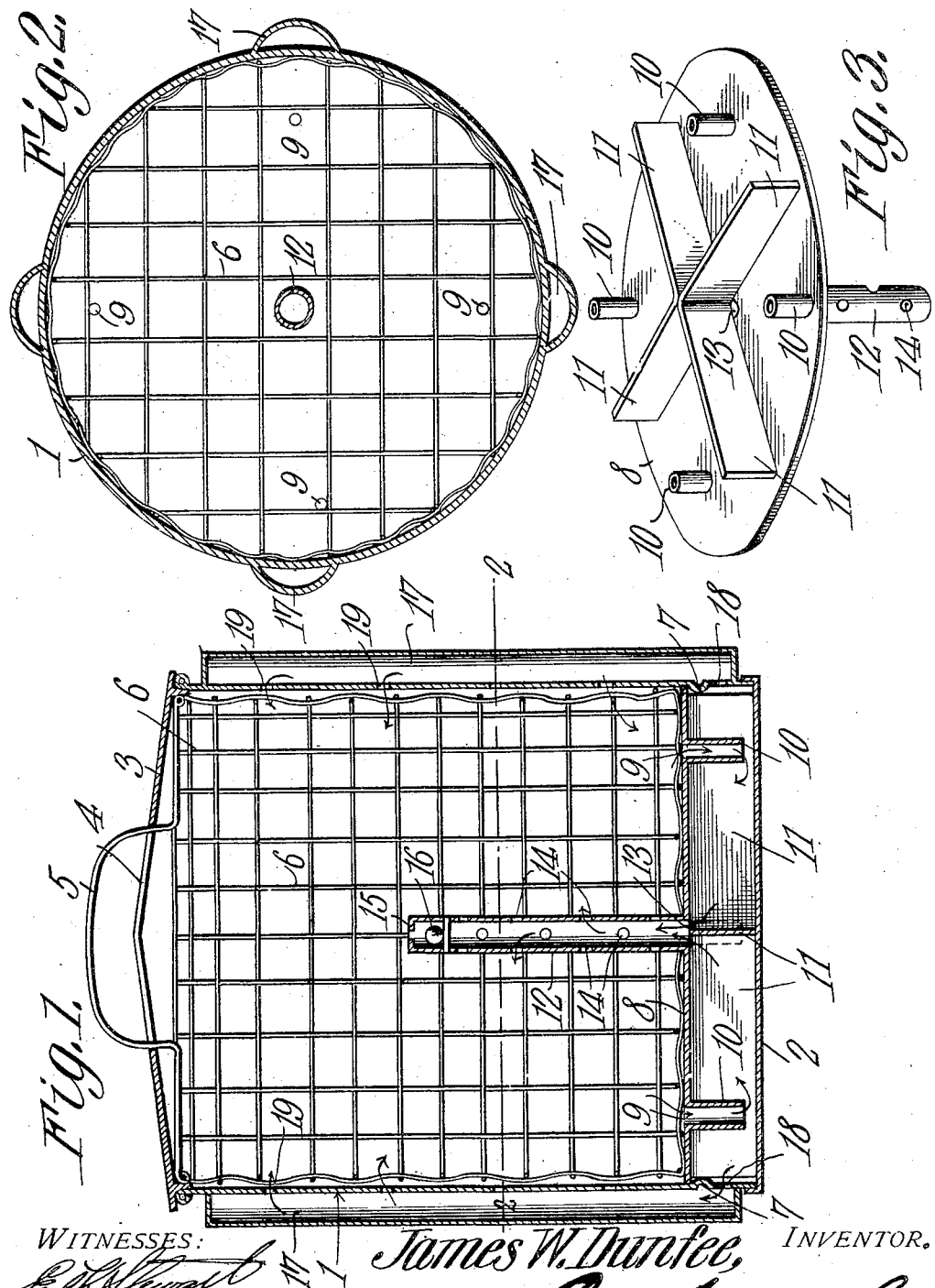

JAMES W. DUNFEE, OF FREMONT, OHIO.

COMBINED COOKER AND WASHER.

No. 877,493.　　　Specification of Letters Patent.　　　Patented Jan. 28, 1908.

Application filed April 24, 1907. Serial No. 370,088.

*To all whom it may concern:*

Be it known that I, JAMES W. DUNFEE, a citizen of the United States, residing at Fremont, in the county of Sandusky and State of Ohio, have invented a new and useful Combined Cooker and Washer, of which the following is a specification.

My present invention relates to improvements in culinary utensils, and it has for its object to provide a device of this character that is adapted to serve the dual purpose of a steaming or cooking utensil, and also a dish washer, thus economizing in the cost and care of an extra vessel and thereby especially adapting it to the needs of campers, as well as to household and hotel uses, the device being so constructed that it is capable of performing the cooking and cleansing operations with the greatest facility, and when employed as a cooker, burning of the food is prevented.

To these and other ends, the invention consists in the novel combination and arrangement of parts, which will be more fully described hereinafter, and set forth particularly in the appended claims.

In the accompanying drawing, Figure 1 represents a central vertical section through a cooker or dish washer constructed in accordance with my present invention. Fig. 2 represents a transverse section on the line 2—2 of Fig. 1. Fig. 3 is a perspective view of the false bottom viewed from the under side.

Corresponding parts in the several figures are indicated throughout by similar characters of reference.

The utensil shown in the present embodiment of the invention comprises a vessel or receptacle 1 preferably of cylindrical shape and having a bottom 2 adapted to rest upon a stove top, and a cover 3 adapted to fit the top of the vessel, the cover having a transverse slot 4 therein through which the handle 5 of the basket 6 extends. The basket 6 is so constructed that the boiling water and steam may readily enter it, and in the present instance it is composed of wire mesh substantially cylindrical in form to fit within the vessel, the cover or lid being so arranged that it will be removed with the basket, and in this way it serves as a shield to prevent the steam scalding the hand.

The side walls of the vessel are provided with a supporting ledge or projection 7 that extends inwardly therefrom, this ledge or projection being formed, in the present instance, by grooving the vertical wall of the vessel, and on this ledge is supported a false bottom 8, the latter fitting closely within the vertical wall of the vessel and having apertures 9 arranged toward its edge, tubes 10 being soldered, or otherwise secured, to the under side of the bottom in alinement with these apertures, and forming passages through which the water above the bottom may pass to the space between the false bottom and the bottom 2 of the vessel. The space between the two bottoms is divided into a series of compartments by means of partitions 11 secured to the under surface of the false bottom and extending between the depending tubes 10 so that each of the tubes 10 discharges into an individual compartment. Arranged axially of the false bottom is a central discharge tube 12 the latter being arranged in alinement with a central opening 13 extending through the false bottom and the discharge tube is provided with a series of vertically arranged discharge openings 14 through which the steam and hot water from the under side of the false bottom is projected into the basket. The upper end of the tube is provided with a valve seat 15 adapted to coöperate with a ball 16 to form a check valve to permit entrance of water to the upper end of the tube and to prevent the water and steam rising in the tube discharging at its upper end.

Arranged vertically on the walls of the vessel are a series of flues 17 one being provided for each compartment in the lower portion of the vessel, apertures 18 extending through the walls of the vessel to establish communication between each flue and its respective compartment, the wall of the vessel above the false bottom and opposite to each flue being provided with a series of perforations 19 discharging inwardly toward the basket.

In operating the utensil as a cooker for steaming or boiling foods, such as vegetables, the articles to be cooked are first placed into the basket and, after the vessel has been partially filled with water, the basket is placed therein, the cover or lid serving to close the vessel and the device is then placed upon the stove. As the water within the several compartments is heated, it will have a tendency to rise by reason of the expansion and consequent decrease of specific gravity, and the water thus heated is forced out of the several compartments through the openings 18 into their respective flues 17, the latter conducting the boiling water through the several discharge apertures 19 upon the articles contained in the basket, the relatively cooler water entering the respective compartments through the depending tubes 10. A portion of the heated water or steam from each of the compartments will pass upwardly through the aperture 13 and into the central discharge tube, and it is projected radially from the latter through the several discharge apertures therein, the boiling water or steam projected from the central tube reaching the articles within the basket from the center while the flues discharge into the basket from the other sides thereof. Substantially the same action takes place when the vessel is employed as a washer, the dishes or other articles to be washed in that case being placed into the basket instead of the food, the steam and boiling water being projected upon the dishes from the several discharge openings with sufficient force to dislodge particles clinging thereto, the continuous flow or circulation of the water assuring a thorough cleansing action.

In employing the utensil as a cooker, the foods are insured from burning or sticking to the vessel when the water has become exhausted, for the reason that the foods are suspended above the bottom of the vessel and overheating of the latter would not injuriously affect the foods, and by varying the height of water in the vessel a steaming or boiling, or a combined steaming and boiling action, may be obtained.

Of course, it will be understood that while I have described the utensil as adapted to be employed both as a cooker and washer, the invention is not so limited, and that the device may be used exclusively for either purpose, and that modifications may be made to adapt it more especially to either use.

What is claimed is:—

1. In a utensil of the character described, the combination with a suitable vessel having series of discharge openings in its walls, and flues communicating with said openings and leading from the lower portion of the vessel to the upper portion of a false bottom arranged transversely of the vessel, means for dividing the space below the false bottom into a series of separate compartments communicating with the respective flues, and a receptacle above the said bottom for the articles to be steamed or boiled.

2. In a utensil of the character described, the combination with a suitable vessel having vertically arranged flues communicating with the lower portion thereof and provided with discharge openings leading from said flues into the upper portion of the vessel, of means for dividing the upper and lower portions of the vessel, partitions dividing the lower portion thereof into separate compartments communicating independently with the respective flues, and a perforated receptacle adapted to fit into the upper portion of the vessel.

3. In a utensil of the character described, the combination with a suitable vessel having vertically extending flues leading from the lower portion thereof, and discharge openings in the upper walls of the vessel communicating with the said flues, of a false bottom supported in the vessel above the bottom thereof and having depending tubes arranged on its under side forming passages for conducting the water from the upper to the lower side of the false bottom, and partitions forming an individual compartment for each flue.

4. In a utensil of the character described, the combination with a suitable vessel having a series of vertically extending flues communicating with the upper and lower portions of the vessel, of means for separating the upper and lower portions of the vessel and having means for permitting a flow of water from the upper to the lower portion, and a partition dividing the lower portion of the vessel into a series of compartments one communicating independently with each flue.

5. In a utensil of the character described, the combination with a suitable vessel having a series of vertically extending flues communicating with the upper and lower portions of the vessel, of a false bottom extending transversely of the vessel and having openings for permitting flow of water from the upper to the lower portion of the vessel, and a series of partitions extending between the openings in said bottom and forming individual compartments for the said flues.

6. In a utensil of the character described, the combination with a suitable vessel having a series of vertically extending flues communicating with the upper and lower portions of the vessel, of a false bottom removably fitted in the vessel and having openings therein for permitting flow of water from the upper to the lower portions, and partitions secured to and projecting downwardly from the said bottom and forming separate compartments for the said openings and their corresponding vertical flues.

7. In a utensil of the character described, the combination with a suitable vessel having a series of vertically extending flues communicating with the upper and lower portions of the vessel, of a horizontal false bottom, partitions on the under side thereof dividing the lower portion of the vessel into a set of compartments which communicate independently with the respective flues and a set of tubes projecting downwardly from the under side of said bottom and each discharging into an individual compartment.

8. In a utensil of the character described, the combination with a suitable vessel, of a false bottom separating the upper and lower portions of the vessel, a set of partitions dividing the space below the false bottom into a set of independent compartments, means for conducting water from the upper side of the bottom to the several compartments, a central discharge tube mounted on the said bottom and communicating with the several compartments, and a set of flues communicating independently with the respective compartments and discharging into the upper portion of the vessel.

9. In a utensil of the character described, the combination with a suitable vessel having a series of vertically extending flues communicating with the upper and lower portions of the vessel, of a false bottom dividing the vessel into upper and lower portions, partitions dividing the space below the false bottom into individual compartments, vertical tubes for conducting water from the upper portion of the vessel to the respective compartments, and a central discharge tube mounted on the said bottom and communicating with the several compartments and having radial discharge apertures, the compartments communicating independently with the respective flues.

10. In a utensil of the character described, the combination with a suitable vessel having a series of vertically extending flues communicating with the upper and lower portions of the vessel, of a false bottom dividing the vessel into upper and lower portions, partitions dividing the lower portion of the vessel into a set of individual compartments communicating with the respective vertical flues, downwardly projecting discharge tubes on the said bottom terminating at a point below the level of the lower ends of the vertical flues, and a central discharge tube arranged to receive fluid from the several compartments and having radially arranged discharge apertures discharging into the upper portion of the vessel.

11. In a utensil of the character described, the combination with a vessel having a circular inturned portion at its lower ledge and having rows of vertically arranged discharge apertures in its walls, and a series of vertically extending flues secured to the outer walls of the vessel and communicating with the said apertures, of a false bottom removably fitted in said vessel and resting on said inturned ledge, depending partitions arranged on the underside of said bottom and dividing the space below the bottom into a series of compartments communicating independently with the respective flues, discharge tubes projecting downwardly from said bottom one for the space between each pair of partitions, and a central discharge tube projecting upwardly from the said bottom and communicating with the upper portions of the several compartments.

12. In a utensil of the character described, the combination with a suitable vessel having a series of vertically arranged flues leading from the bottom and discharging into the upper portion of the vessel, and a false bottom fitted into the vessel having means communicating with the lower portion of the vessel at a point below the said flues for conducting fluid from the upper portion to the lower portion of the vessel and individual compartments formed below the false bottom and communicating independently with the respective vertical flues, of a foraminous basket removably fitted into the upper portion of the vessel and having an upwardly projecting handle, and a cover fitting the top of the vessel and having an opening to permit the handle of the basket to project to the upper side thereof.

In testimony that I claim the foregoing as my own, I have hereto affixed my signature in the presence of two witnesses.

JAMES W. DUNFEE.

Witnesses:
WALTER S. KRIDLER,
JOSEPH BINSACK.